United States Patent
Ric et al.

(10) Patent No.: US 8,989,958 B2
(45) Date of Patent: Mar. 24, 2015

(54) METHOD AND DEVICE FOR CONFIGURING AN ON-BOARD MAINTENANCE INFORMATION SYSTEM IN AN AIRCRAFT

(75) Inventors: Georges Ric, Frouzins (FR); François Beltrand, Villeneuve Tolosane (FR)

(73) Assignee: AIRBUS Operations S.A.S., Toulouse (FR)

( * ) Notice: Subject to any disclaimer, the term of this patent is extended or adjusted under 35 U.S.C. 154(b) by 938 days.

(21) Appl. No.: 12/908,471

(22) Filed: Oct. 20, 2010

(65) Prior Publication Data
US 2011/0218701 A1 Sep. 8, 2011

(30) Foreign Application Priority Data
Nov. 5, 2009 (FR) ...................................... 09 57851

(51) Int. Cl.
*H04L 29/06* (2006.01)
*H04L 29/08* (2006.01)
*H04L 12/40* (2006.01)
*B64D 45/00* (2006.01)
*B64F 5/00* (2006.01)

(52) U.S. Cl.
CPC ............ *H04L 63/0245* (2013.01); *H04L 67/12* (2013.01); *H04L 2012/4028* (2013.01); *B64D 2045/0085* (2013.01); *B64F 5/0045* (2013.01)
USPC .......................................................... 701/33

(58) Field of Classification Search
CPC ................................ G01M 17/00; G06F 19/00
USPC .................. 701/33, 24, 29; 713/189
See application file for complete search history.

(56) References Cited

U.S. PATENT DOCUMENTS

2004/0215931 A1* 10/2004 Ellis .................................. 712/36
2007/0115938 A1* 5/2007 Conzachi et al. ............. 370/352
2009/0192659 A1 7/2009 Beebe et al.

FOREIGN PATENT DOCUMENTS

WO WO 2007/064655 A1 6/2007

OTHER PUBLICATIONS

French Preliminary Search Report issued Aug. 13, 2010, in French 0957851, filed Nov. 5, 2009 (with English Translation of Categories of Cited Documents).

* cited by examiner

*Primary Examiner* — John R Olszewski
*Assistant Examiner* — Jason Roberson
(74) *Attorney, Agent, or Firm* — Oblon, McClelland, Maier & Neustadt, L.L.P.

(57) ABSTRACT

Configuring an on-board maintenance information system in an aircraft, the information system comprising a first communication interface and a second communication interface, a protected domain, an open domain, a first maintenance application module of the protected domain, a second maintenance application module of the open domain, a first data filtering module, and a second data filtering module. After having determined a mode of connection for a mobile maintenance terminal to the information system, the second data filtering module is configured to filter data exchanged between the first communication interface and the maintenance application module of the open domain if the terminal is directly connected to the information system via the second interface. If the terminal is connected to the information system via an information system on the ground and via the first communication interface, the second data filtering module is configured to filter data exchanged between maintenance application modules of the protected and open domains.

19 Claims, 7 Drawing Sheets

METHOD AND DEVICE FOR CONFIGURING AN ON-BOARD MAINTENANCE INFORMATION SYSTEM IN AN AIRCRAFT

This invention relates to the maintenance operations of an aircraft and more particularly to a method and a device for configuring an on-board maintenance information system in an aircraft in order to optimize the maintenance operations performed from a mobile maintenance terminal.

In order to optimize the reliability of aircraft and to increase their profitability, maintenance operations frequently are implemented between flight phases. They may or may not be carried out when the aircraft is at its base.

In general, for maintenance operators such operations consist, for example, in verifying the hardware and software configuration of the systems of the aircraft, analyzing the data stored during the flight (ongoing monitoring), modifying certain parameters of the aircraft or certain software data, launching test software applications and/or checking the change of software configuration following a downloading operation.

The analyzed data often originate from sensors and are stored in a central diagnostic and storage device accessible through a man-machine interface of MCDU (abbreviation for Multi-Control Display Unit in English terminology) or OMT (abbreviation for Onboard Maintenance Terminal in English terminology) type. This interface, through which interactive operations may be launched, makes it possible to analyze stored data, access the parameters of the aircraft and more generally to execute test and maintenance functions.

Access to the maintenance systems of aircraft generally is limited to on-board fixed physical stations in the cockpit. Thus, when the aircraft is on the ground, a maintenance operator may board the aircraft in order to access and analyze the stored data, if need be modify the parameters of the aircraft, and launch test applications.

Alternatively, in order to meet a growing demand of the airline companies to reduce the time of maintenance operations, mobile maintenance terminals are used. The latter, the function of which is similar to the interfaces of MCDU or OMT type, are connected to the central diagnostic and storage device through connection plugs connected to the network of the aircraft.

FIG. 1 illustrates an exemplary aircraft 100 comprising a central diagnostic and storage device 105. This device is accessible, via an internal communication network (not shown), at a maintenance terminal 110, fixed or mobile. The mobile maintenance terminals generally are called PMAT (acronym for Portable Maintenance Access System in English terminology).

Device 105 is connected to all the systems of the aircraft generating maintenance messages, for example to sensors (not shown) for monitoring the engines and the actuators for the landing gears and control surfaces.

In this way, when aircraft 100 is on the ground, with the aid of terminal 110 a maintenance operator may analyze the flight data of the aircraft and modify the parameters thereof.

Furthermore, the airline companies operating these aircraft generally have maintenance information systems on the ground, also called MIS (acronym for Maintenance Information System in English terminology), in order to ensure the tracking of the state of their fleet of aircraft. These information systems are operated in particular by maintenance control centers, also called MCC (abbreviation for Maintenance Control Center in English terminology), and maintenance operators of the airline company.

As illustrated on FIG. 1, data may be transmitted directly from an aircraft 100 to a maintenance information system of an airline company 115, for example through an IP (abbreviation for Internet Protocol in English terminology) type link. These data may be processed by the maintenance information systems for tracking the state of the fleet of aircraft. Moreover, these data make it possible to build up the experience acquired during the operation of the aircraft and thus optimize maintenance operations.

In this way, although maintenance operations may be executed from a mobile maintenance terminal and maintenance data originating from the aircraft may be used to optimize the maintenance operations, there nonetheless is a need to improve them.

The invention makes it possible to resolve at least one of the problems set forth above.

The invention thus has as an object a method for configuring an on-board maintenance information system in an aircraft, the said information system comprising at least a first and a second communication interface, a protected domain and an open domain, each of the said domains comprising at least one maintenance function, and a data filtering module, this method comprising the following steps, determining a mode for connection of a mobile maintenance terminal to the said information system;

if the said mobile maintenance terminal is directly connected to the said information system via the said first communication interface, configuring the said filtering module to filter the data exchanged between the said second communication interface and the said at least one maintenance function of the said open domain; and if the said mobile maintenance terminal is connected to the said information system via a maintenance system on the ground and via the said second communication interface, configuring the said filtering module to filter the data exchanged between the said at least one maintenance function of the said protected and open domains.

In this way the method according to the invention makes it possible to adapt the configuration of data-securing elements of an on-board maintenance information system in an aircraft according to a maintenance mode of the aircraft. In a first mode for connection of a mobile maintenance terminal to this information system, securing elements protect the on-board maintenance function in order, in particular, to isolate the internal network of the aircraft from an outside network so that communication functionalities of the aircraft are always accessible to third parties. In a second mode for connection of a mobile maintenance terminal to this information system, via a maintenance information system on the ground, securing elements protect the protected domain with regard to the open domain, that is to say, in particular, the avionics.

The said filtering module advantageously comprises a robust filter configured to transmit only data satisfying predetermined rules so as to control the data exchanged.

According to a specific embodiment, the method further comprises a step of configuring the said connection mode, the said step of configuring the said connection mode being carried out in a protected zone of the said aircraft.

Still according to a specific embodiment, the method further comprises a step of configuring a second filtering module, this step of configuring the said second filtering module comprising the following steps, if the said mobile maintenance terminal is directly connected to the said information system via the said first communication interface, configuring the said second filtering module to filter the data exchanged between the said at least one maintenance function of the said protected and open domains; and, if the said mobile maintenance terminal is connected to the said information system via a maintenance information system on the ground and via the said second communication interface, configuring the said filtering module to filter the data exchanged between the said second communication interface and the said at least one maintenance function of the said open domain.

In this way the method according to the invention makes it possible to adapt the configuration of additional data filtering elements of an on-board maintenance information system in an aircraft according to a maintenance mode of the aircraft in order to improve the reliability of data exchanges.

The invention also has as an object a computer program comprising instructions adapted for the implementation of each of the steps of the method described above when the said program is executed on a computer. The advantages obtained with this computer program are similar to those mentioned above.

The invention also has as an object a device for configuring an on-board maintenance information system in an aircraft, the said information system comprising at least a first and a second communication interface, a protected domain and an open domain, each of the said domains comprising at least one maintenance function, and a data filtering module, this device comprising the following means, means for determining a mode for connection of a mobile maintenance terminal to the said information system;

means for configuring the said filtering module to filter the data exchanged between the said second communication interface and the said at least one maintenance function of the said open domain if the said mobile maintenance terminal is directly connected to the said information system via the said first communication interface; and, means for configuring the said filtering module to filter the data exchanged between the said at least one maintenance function of the said protected and open domains if the said mobile maintenance terminal is connected to the said information system via a maintenance information system on the ground and via the said second communication interface.

In this way the device according to the invention makes it possible to adapt the configuration of data securing elements of an on-board maintenance information system in an aircraft according to a maintenance mode of the aircraft. In a first mode for connection of a mobile maintenance terminal to this information system, securing elements protect the on-board maintenance function in order, in particular, to isolate the internal network of the aircraft from an outside network so that communication functionalities of the aircraft are always accessible to third parties. In a second mode for connection of a mobile maintenance terminal to this information system, via a maintenance information system on the ground, securing elements protect the protected domain with regard to the open domain, that is to say, in particular, the avionics.

The device preferably further comprises means for configuring the said connection mode, the said means for configuring the said connection mode being located in a protected zone of the said aircraft.

According to a specific embodiment, the device further comprises at least two switches controlled by a command signal representing the said connection mode, a first of the said at least two switches being connected to the said filtering module and to the said at least one maintenance function of the said protected domain or of the said open domain and a second switch of the said at least two switches being connected to the said filtering module and to the said at least one maintenance function of the said open domain or to the said second communication interface. In this way these switches make it possible to adapt the configuration of the securing elements according to the connection mode of the mobile maintenance terminal.

Still according to a specific embodiment, the device further comprises means for configuring a second filtering module, the means for configuring the said second filtering module comprising the following means, means for configuring the said second filtering module to filter the data exchanged between the said at least one maintenance function of the said protected and open domains if the said mobile maintenance terminal is directly connected to the said information system via the said first communication interface; and, means for configuring the said filtering module to filter the data exchanged between the said second communication interface and the said at least one maintenance function of the said open domain if the said mobile maintenance terminal is connected to the said information system via a maintenance information system on the ground and via the said second communication interface.

In this way the device according to the invention makes it possible to adapt the configuration of additional data filtering elements of an on-board maintenance information system in the aircraft according to a maintenance mode of the aircraft in order to improve the reliability of data exchanges.

The invention also has as an object an aircraft comprising the device described above. The advantages obtained with this aircraft are similar to those mentioned above.

Other advantages, purposes and characteristics of this invention become apparent from the detailed description that follows, presented by way of non-limitative example, with reference to the attached drawings in which:

FIG. 1 shows an aircraft comprising a central diagnostic and storage device able to be accessed by a maintenance terminal and able to transmit data to a maintenance information system on the ground;

FIG. 2 schematically illustrates the architecture of a part of the information system of an aircraft allowing an information system of an airline company to access data and maintenance functions of the aircraft;

FIG. 3 schematically illustrates an exemplary algorithm implemented in an information system of an aircraft to make it possible to access maintenance functions of the aircraft remotely;

FIG. 4 partially shows an Ethernet frame on which a filtering may be performed;

Figure 1:
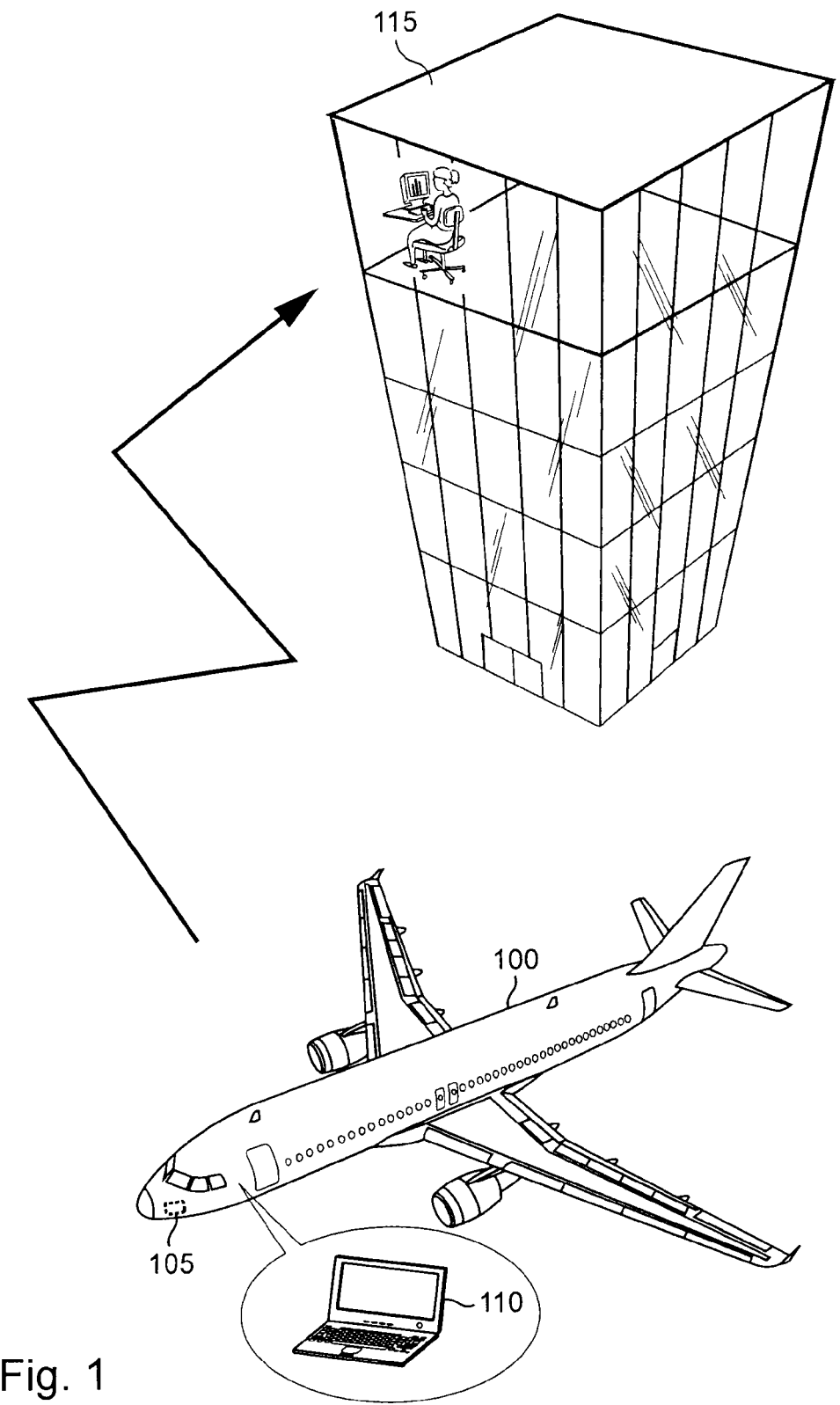

In general, the invention makes it possible to perform maintenance operations in an aircraft from a mobile maintenance terminal (PMAT) according to two different modes linked to the situation, in operation ("line" mode) or to its base ("base" mode), of the aircraft.

It uses the information system, the maintenance functions and the communication means of the aircraft as well as the maintenance tools deployed on the ground and mobile maintenance stations in order to enable the maintenance operators to benefit from both modes of access to the maintenance functions of the aircraft. The architecture of the on-board information system of the aircraft, in particular that of the elements for securing the exchanged data, is adapted according to the maintenance operation modes.

The communication means implemented among the information systems of the aircraft, the information systems on the ground and the mobile terminals preferably are in compliance with the IP (abbreviation for Internet Protocol in English terminology) protocol. According to the mode used to access the maintenance functions of the aircraft, the connection of the mobile terminal is achieved via an internal network of the aircraft or via an external network, which may be regarded as an extension of the network of the airline company operating the aircraft.

According to the "base" mode implemented when the aircraft is at its base, the maintenance operator may access data and maintenance functions of the aircraft as well as information items from maintenance information systems on the ground (MIS). The operator thus has the means for establishing a diagnosis of the aircraft, for consulting the databases of the MIS and for performing the maintenance operations required to allow the aircraft to perform its missions and anticipate possible failures. In this mode, the elements of the information system of the aircraft for securing the exchanged data are configured to protect the domain associated with conducting the flight (avionics). According to this mode, the mobile maintenance terminal accesses the maintenance functions of the aircraft via an external network, which may be regarded as an extension of the network of the airline company operating the aircraft.

According to the "line" mode, the maintenance operator may access only the data and maintenance functions of the aircraft when the aircraft is not at its base. The operator thus has the means for establishing a diagnosis of the aircraft and for performing the maintenance operations necessary to allow the aircraft to continue its mission. In this mode, the connection of the mobile maintenance terminal is achieved via an internal network of the aircraft. Only the on-board data and maintenance functions are accessible here. The elements for securing the exchanged data are configured to protect the on-board maintenance functions and to isolate the internal network from the outside so that the outside network may be used for commercial purposes. The communication means of the external network thus may be used, for example, to give passengers access to their personal e-mail and/or to the Internet.

In the "base" mode, the operator uses a PMAT configured to be connected to the MIS, with a wired or wireless link. The MIS here comprises an interface making it possible to implement a secured connection with the aircraft giving him remote access to data and maintenance functions. In this way, the operator may be connected with the aircraft via the MIS. He thus may access a considerable number of information items enabling him to benefit from the real-time analysis and engineering skills of the ground crews.

In the "line" mode, the maintenance operator uses a PMAT configured to connect only to an internal network of the aircraft on which the operator is going to intervene. In this mode, only the data and the maintenance functions of the aircraft are accessible. The maintenance operator therefore limits his intervention to the diagnosis of the aircraft and to the necessary maintenance operations, making it possible to ensure the level of safety required for continuation of the mission of the aircraft, while allowing other users to utilize the external network of the aircraft.

The communication mode preferably is determined according to the state of a control with at least two states which can be activated only in a secured zone of the aircraft. It concerns, for example, a manual control such as a push-button integrated into the cockpit or in an avionic bay.

In this way the invention makes it possible to optimize the use of the information system of the aircraft and to improve the reliability of the maintenance operations by providing all the data useful to the maintenance operators.

It is seen here that, by default, when they are activated, the mobile maintenance terminals try to connect to the MIS before attempting a direct connection to an aircraft in order to allow the maintenance operators to access the MIS information items, if possible.

The generation of the on-board information system in some modern aircraft depends on an architecture that allows the aircraft to be interconnected with a data communication network on the ground via secured IP communication means while ensuring that the components making it possible to achieve aircraft safety are in accordance with the required confidence level.

By way of illustration, the platform supporting the maintenance functions may be developed in accordance with the aeronautical standard DO-178B (standard for software development quality level according to a given target, for example software quality assurance level DAL C).

The platform supporting the maintenance functions thus is such that the information items originating therefrom are reliable data.

Moreover, in order to ensure a sufficient level of security for exchanged data, a robust data-flow filtering element is implemented in particular in the information system of the aircraft. It allows the aircraft, via the secured IP communication means, to be regarded as an extension of the network of the airline company operating this aircraft without compromising the safety thereof.

The information system of the airline company therefore may access the data from the platform of the aircraft supporting the maintenance functions and execute these functions in automatic and deported manner.

Figure 2:
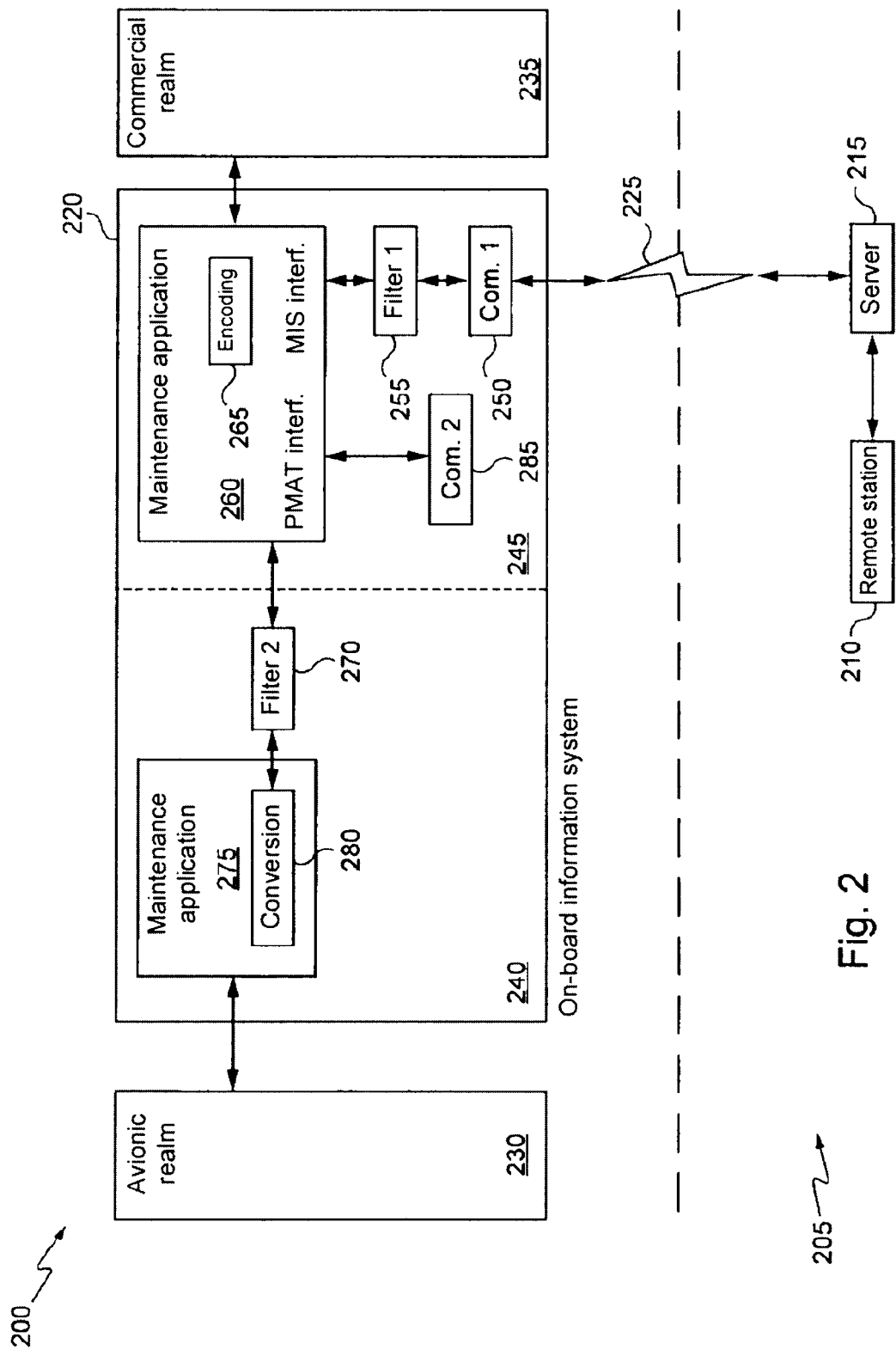

FIG. 2 schematically illustrates the architecture of a part of the information system of an aircraft allowing an information system of an airline company as well as a mobile maintenance terminal to access data and maintenance functions of the aircraft.

Reference 200 here designates the systems taken on board the aircraft while reference 205 designates remote systems of the airline company operating the aircraft.

The remote system comprises a remote station 210, for example a computer of PC (abbreviation for Personal Computer in English terminology) type, and a server 215 making it possible to establish a data communication with on-board information system 220 of the aircraft through network 225.

Two types of data may be processed by the remote station or the test station: the data originating from the aircraft and the command data making it possible to execute maintenance functions on board the aircraft.

On-board information system 220 of the aircraft is connected to avionic systems 230, for example the flight control systems, the automatic pilot and the environmental monitoring systems, and to systems of the commercial realm 235, referred to as "open," unlike the avionic realm, because of the origin of the processed data and the nature of the applications executed.

Furthermore, on-board information system 220 comprises two parts, a specially secured part 240, called confidence realm or protected domain, and a less secured part 245, called connected realm or open domain.

Open domain 245 comprises communication module 250 adapted for receiving and transmitting data from and to network 225, for example according to the IP protocol. Communication between server 215 and communication module 250 preferably is carried out through a secured tunnel such as a VPN (abbreviation for Virtual Private Network in English terminology) link.

Communication module 250 is connected to a filtering module 255 which itself is connected to a maintenance application module 260 (via an interface of MIS type) comprising an encoding module 265 used to encode the data to be transmitted to protected domain 240 of on-board information system 220.

Furthermore, communication module 250 makes it possible to exchange data directly with commercial realm 235.

Protected domain 240 comprises a filtering module 270 adapted for controlling the data exchanged with open domain 245.

Protected domain 240 further comprises a maintenance application module 275 itself comprising a conversion module 280 adapted for converting the data received from filtering module 270 so that they may be used by maintenance application module 275.

As illustrated, maintenance application module 275 of protected domain 240 is connected to the systems of avionic realm 230.

The information system of the aircraft further comprises, in open domain 245, a second communication module 285, connected to maintenance application 260 via a PMAT interface, making it possible to access an internal network of the aircraft directly in order to perform maintenance operations.

In order to enable remote station 210 to access the maintenance of an aircraft via on-board information system 220, filter 255 is not necessary. However, a standard filter such as a firewall (called firewall in English terminology) may be involved. On the contrary, filter 270 must be a robust filter to isolate protected domain 240 from open domain 245 and from commercial realm 235. Such a robust filter is, for example, similar to the one described with reference to FIG. 4.

Figure 3:
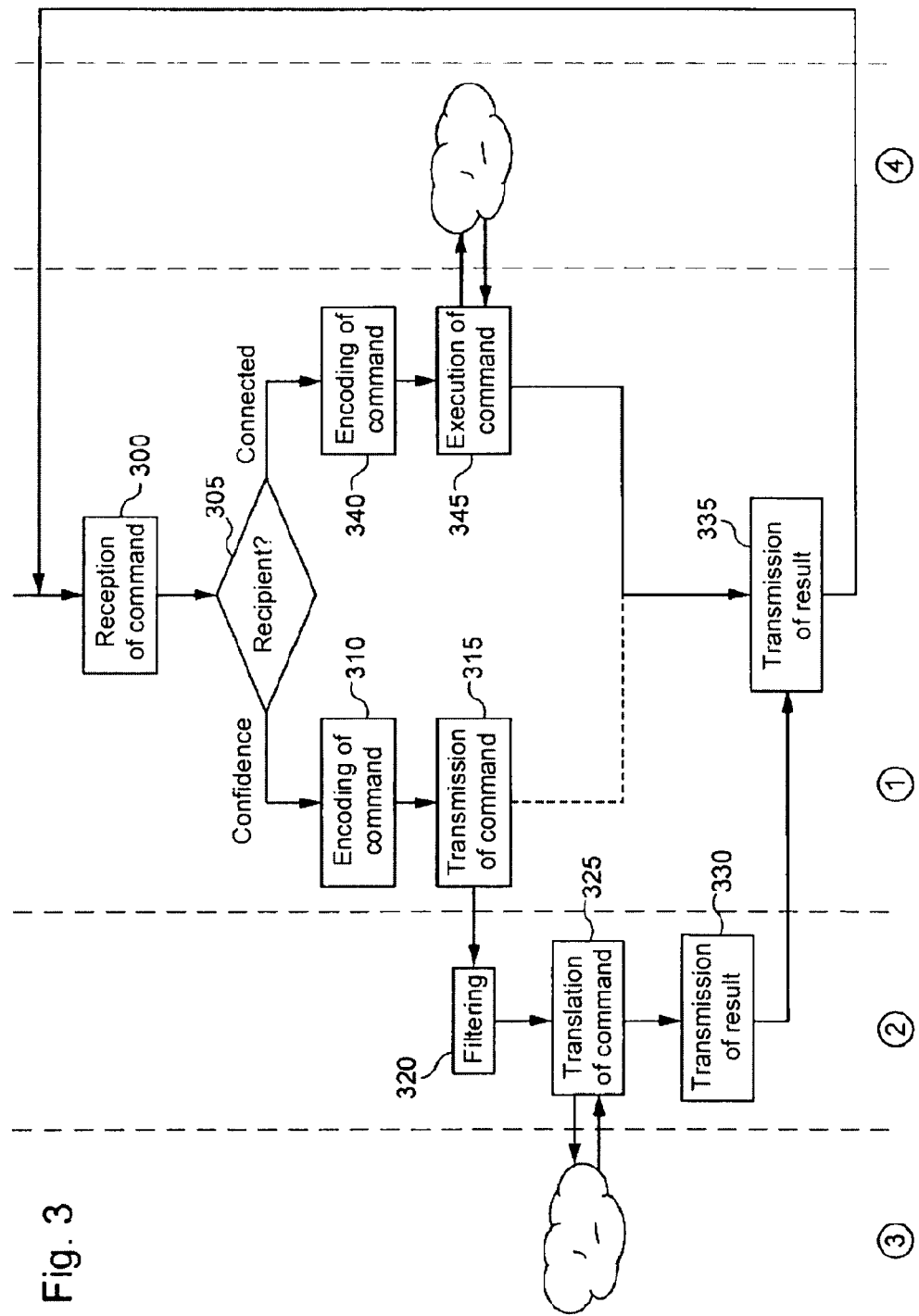

FIG. 3 schematically illustrates an exemplary algorithm implemented in an information system of an aircraft in order to allow remote access to maintenance functions of the aircraft.

Reference ① here designates the part of the algorithm implemented in the open domain of the information system of the aircraft, reference ② designates the part of the algorithm implemented in the protected domain of the information system of the aircraft, reference ③ designates the functions implemented in the confidence realm, that is to say here the avionics, and reference ④ designates the functions implemented in the commercial realm.

After having received a command (step 300) from a remote post via, for example, a secured communication tunnel established beforehand, a test is performed (step 305) in order to identify the recipient of the received command.

If the recipient of the received command is located in the protected domain, the command is encoded (step 310) in order to make it compatible with the robust filter used at the input of the protected domain, then transmitted to the latter (step 315). The command and/or data exchange between the secured and open domains preferably is carried out via a dedicated internal network.

The encoding consists, for example, in encoding the commands in the form of frames having a predetermined format and/or characteristics. The filtering then consists in verifying this format and/or these characteristics.

As indicated above, when the protected domain of the information system of the aircraft receives a command from the open domain, the received command is filtered (step 320) with the aid of a robust filter. The commands not in accordance with the predetermined criteria of the filter are rejected. The filtered commands are converted or translated (step 325) by a translation module of the protected domain in order to allow their execution by the intended maintenance function.

The maintenance function sought, for example a test management module or a test configuration management module, executes the received command or manages its execution and, preferably, sends a response, for example a configuration or a result, to the command translation module which constructs a corresponding file. This file then is transmitted (step 330) to the maintenance function of the open domain of the information system of the aircraft which transfers the received information items to the remote station (step 335).

If the recipient of the received command is located in the open domain, the command is encoded (step 340) in standard manner to make it compatible with the protocols used in the systems of the connected realm. It then is executed (step 345) and, if a response is determined, the latter is transmitted to the remote station (step 335).

As indicated above, the filtering module comprising a robust filter here has as an object to filter the data received from the network so as to transmit only the correctly formatted data to the protected domain of the information system of the aircraft.

The filtering module comprising a robust filter preferably is based on the principle of the screen, that is to say an iterative mechanism, according to which several levels of filters are used to optimize the processing times. It thus is composed of several elements making it possible to filter the received data more and more finely so as to let only the data corresponding to valid commands go through. An example of such a robust filter is described in the patent application FR 2 927 181 filed in the name of the company Airbus France.

The filtering module comprising a robust filter requires that a command format be defined so as to process only a certain type of network frames. The format and the associated transport protocol may be defined in the form of parameters, accessible to the filtering module. For example, such parameters may specify that the commands are received in the form of Ethernet frames, indicate the sources authorized to transmit such commands, give a maximal lifetime for the frames beyond which the frames are not taken into account and indicate the characters that may be used validly for encoding a command in a frame.

By way of illustration, the filtering of Ethernet frames may be performed in three steps.

Figure 4:
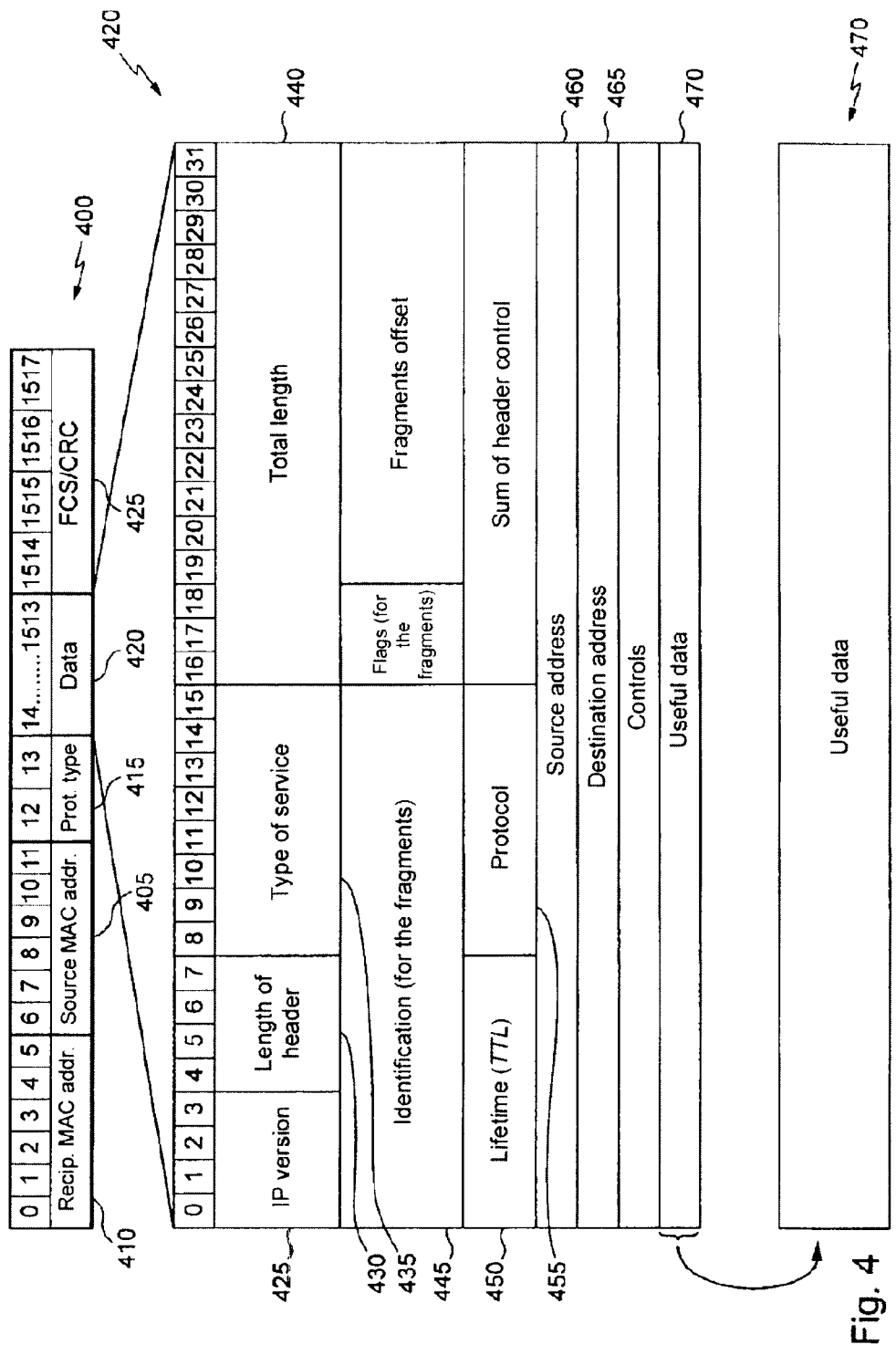

FIG. 4 partially shows an Ethernet frame 400 on which a robust filtering may be performed according to these three steps.

First of all, each frame is analyzed by verifying, for example, source physical address 405 and destination physical address 410, in particular the MAC (acronym for Media Access Control in English terminology) addresses, type of protocol 415 and signature 425 of the complete frame. Data 420 of the frame are not analyzed in this first step.

If source physical address 405 and destination physical address 410, type of protocol 415 and signature 425 are not in accordance with the parameters of the filtering module, the frame is rejected.

On the contrary, if source physical address 405 and destination physical address 410, type of protocol 415 and signature 425 are in accordance with the parameters of the filtering module, a second filtering step is implemented.

It should be noted here that the first filtering step may focus on data other than those mentioned or, on the contrary, fewer data.

The second step consists, for example, in analyzing the header of the data 420. In particular, this second filtering step may consist in verifying IP version 425, length 430 of the header, type of service 435, total length 440 of the data, identification 445 used to reconstitute the fragments, lifetime 450, also called TTL (abbreviation for Time To Live in English terminology), protocol 455 and source address 460 and destination address 465.

Again, if all these information items are not in accordance with the parameters of the filtering module, the frame is rejected. On the contrary, if all these information items are in accordance with the parameters of the filtering module, a third filtering step is implemented.

It also should be noted here that the second filtering step may focus on data other than those mentioned or, on the contrary, fewer data.

The third step here consists in analyzing the characters of the useful data 470 of the frame. This step thus makes it possible to verify that the characters necessary for construction of the command may not be used to construct an executable code. Advantageously, all the characters of the useful data should be chosen in the ASCII table, in the values ranging between 032 and 090.

If a character of the useful data 470 does not belong to the ASCII table, between the values 032 and 090, the frame is rejected. On the contrary, if all the characters of the useful data 470 belong to the ASCII table, between the values 032 and 090, the frame is transmitted to the secured part of the information system of the aircraft to be processed there.

Naturally, the third filtering step may focus on other criteria, in particular more restrictive criteria.

The translation of filtered commands has as an object to establish an interface between the maintenance functions and the network.

This module preferably is developed so that only the commands linked to instructions corresponding to maintenance functions implemented in the secured part of the information system of the aircraft have an effect. This means that this module knows the instructions that may be executed by each application. In other words, a list of instructions or sequence of instructions preferably is stored beforehand. Such a list defines a set of configurations of possible strings of instructions. This list also may define prohibited combinations.

This configuration is constructed in such a way that the string of instructions for an application is known a priori. This enables the conversion to verify that the commands that it receives and the string of the associated instructions are in accordance with what the application is supposed to execute. This verification enables the conversion module to reject any unexpected string and thus ensures that dangerous operations cannot be executed.

In a specific embodiment, the conversion module uses a table of correspondence between the names of the commands and the actual functions, that is to say the sequences of instructions, so as to associate one or more instructions with the names of commands received from the remote station. It should be noted here that the instructions may take several forms. For example, pointers to functions or commands interfaced with the operating system of the maintenance device are involved. The instructions make it possible in particular to simulate an action input by a user on the interface of the maintenance device accessible in the aircraft.

After a command has been analyzed and declared in conformity, the conversion module transmits the instructions corresponding to the application concerned. The application executes the instructions and generally sends back a response. This response is received by the conversion module which constructs a response message, preferably signed.

Figure 5:
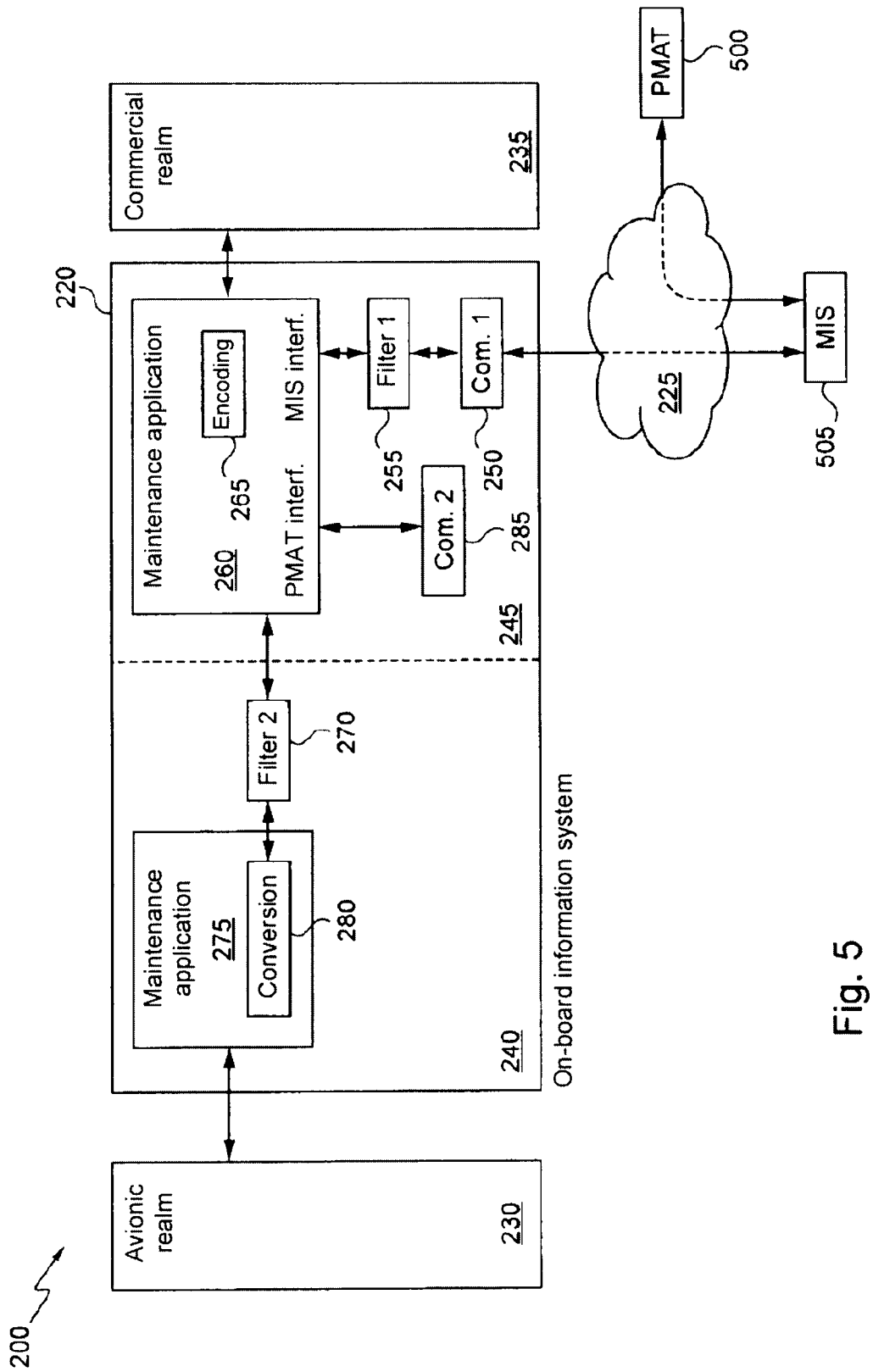
FIG. 5 illustrates a mode for connection of a mobile maintenance terminal to an information system of an aircraft, via a maintenance information system on the ground.

FIG. 5 illustrates the "base" mode for connection of a PMAT to an information system of an aircraft, via a maintenance information system on the ground, for example a ground maintenance system of an airline company operating this aircraft.

When PMAT 500 is connected to communication network 225 to which an MIS 505 also is connected, it connects to the latter according to a standard protocol. More precisely, PMAT 500 connects to a server (not shown) of MIS 505 to which tools and databases (not shown) of the airline company operating the aircraft may be connected.

Similarly, information system 220 of an aircraft may connect to MIS 505 via network 225 or a separate network. For these purposes, a server (not shown) of MIS 505 connects to open domain 245 of information system 220 via communication module 250 and filtering module 255. As indicated above, open domain 245 is connected to the systems of commercial realm 235 via communication module 250 as well as to maintenance applications 275, via filtering modules 255 and 270, to which the avionics 230 is connected.

Advantageously, PMAT 500 and information system 220 are connected to communication network 225 by a wireless link. Moreover, in order to ensure the mobility of the maintenance operator around and in the aircraft, a wireless network of the aircraft is configured as an extension of network 225 so as to allow connection of PMAT 500 to MIS 505 via this wireless network of the aircraft. This particular function that may be implemented in certain wireless aircraft networks thus ensures an itinerancy function (called roaming in English terminology) for the PMAT between the outside and the inside of the aircraft.

When these connections are established, PMAT 500 may access information items from MIS 505 as well as data and maintenance functions of the aircraft via MIS 505. In this way PMAT 500 may access data and maintenance functions of the aircraft in a manner similar to a remote station of a maintenance information system on the ground, as described with reference to FIGS. 2 to 4.

Figure 6:
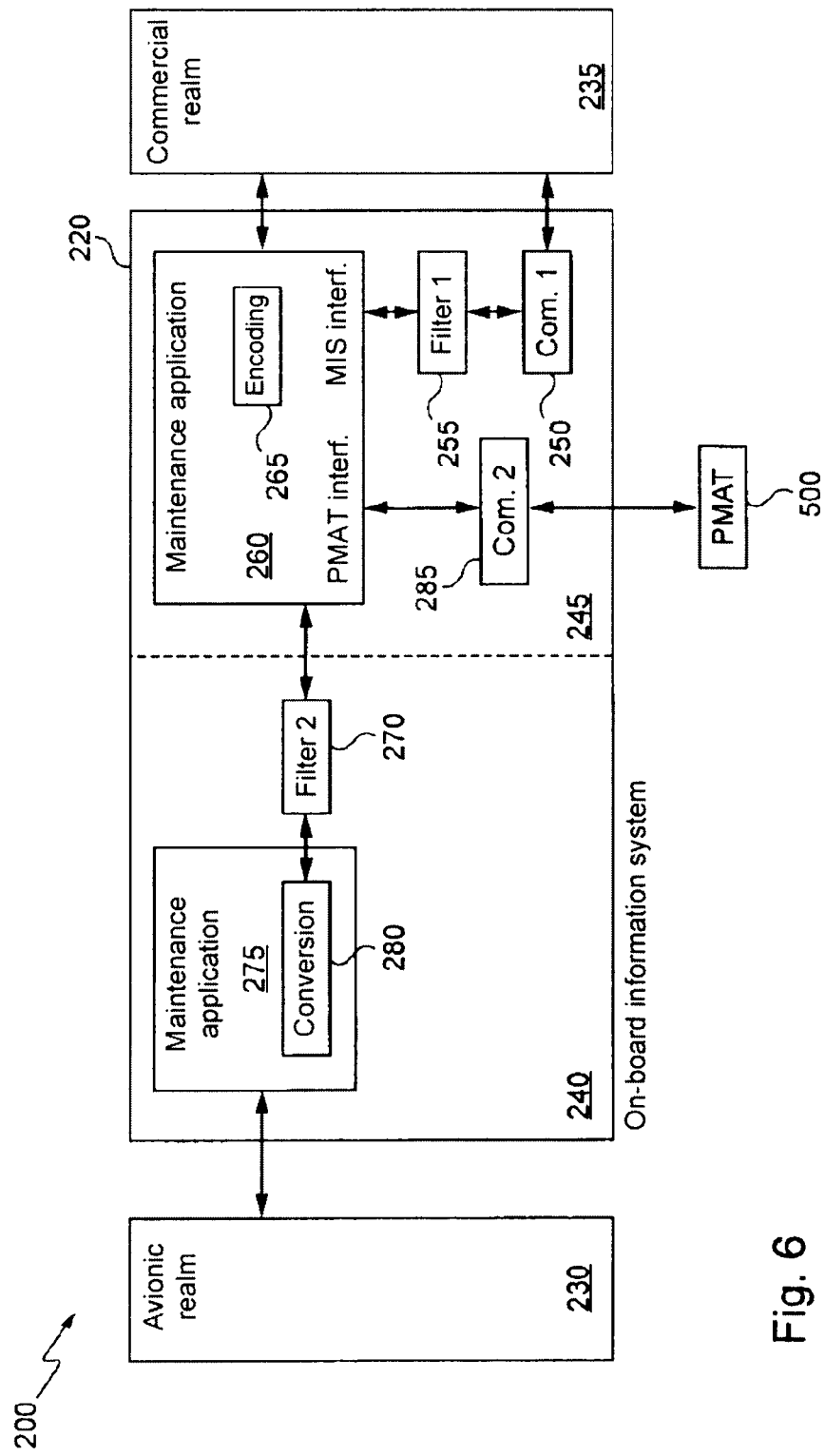
FIG. 6 illustrates a mode for direct connection of a mobile maintenance terminal to an information system of an aircraft; and, FIG. 7, comprising FIGS. 7a and 7b, schematically illustrates an exemplary use of switches to configure an information system of an aircraft according to the mode for connection of a mobile maintenance terminal thereto.

FIG. 6 illustrates the "line" mode for connection of a PMAT to an information system of an aircraft.

This communication mode is implemented for example when the PMAT is unable to connect to a maintenance information system on the ground. In this case, the PMAT connects to a communication module connected to an internal network of the aircraft and allowing the PMAT to exchange data and commands directly with the maintenance applications via a robust filter, with no connection to the commercial realm being possible.

For these purposes, PMAT 500 here connects to communication module 285 itself connected to maintenance applications 260 of the open domain and to maintenance applications 275 of the protected domain via filtering module 270. The latter is not necessary. Nonetheless, a standard filter such as a firewall may be involved.

Thus, when this connection is established, PMAT 500 may access data and maintenance functions of the aircraft. Simultaneously, the applications of the commercial realm may use communication module 250 without reducing the security level of the protected domain of information system 220, that is to say by controlling the exchanges of data and commands between communication module 250 and maintenance applications 260 making it possible to access the protected domain of information system 220. For these purposes, filtering module 255 here integrates a robust filter such as the one described with reference to FIG. 4.

According to a first embodiment, the configuration of filtering modules 255 and 270 is carried out in logic manner according to the state of a command. After having detected the position of the connection command according to the "base" mode or the "line" mode, filtering modules 255 and 270 are configured automatically in order to implement a robust filter or a simple firewall-type filter.

In "base" mode, an effective protection must be implemented between the open and secured domains so as to ensure the required safety level for the aircraft. For these purposes, the filtering module making it possible to access the information system of the aircraft from an outside network comprises a simple filter such as a firewall, while the filtering module implemented between the maintenance functions of the open and secured domains comprises a robust filter.

Thus, in this connection mode, the maintenance operators may access the maintenance databases available through the ground network of the company (mainly via the MIS) from their PMAT while being able to execute maintenance functions of the aircraft.

It is noted here that, according to this connection mode, the security threat to the aircraft is linked essentially to the communication network of the airline company and to the applications of the commercial realm. Consequently, in addition to the use of a robust filter between the open and secured zones, the connection between the information systems on the ground and on board in the aircraft is ensured via a secured tunnel and the data are signed by the ground server. For this reason, only the MIS-type interface to which the filter is connected is capable of processing the received data.

In "line" mode, an effective protection must be implemented in order to protect the open and secured domains so as to maintain the safety level of the aircraft. For these purposes, the filtering module making it possible to access the information system of the aircraft from an outside network comprises a robust filter, while the filtering module implemented between the maintenance functions of the open and secured domains comprises a simple firewall-type filter.

It is seen here that since the data necessary for the maintenance operations are available on board the aircraft, the connection to a communication network on the ground is not essential. The configuration of the filters thus makes it possible to ensure that the availability of the aircraft is optimal even if it does not connect to a communication network of the airline company.

In this mode, the residual security threat is linked to the PMAT. In order to minimize the associated risk, the connection of the PMAT to the internal network of the aircraft is carried out via a secured tunnel. Moreover, an additional filter function, for example with the aid of a firewall, ensures that only authorized data flows access the protected domain.

Consequently, with reference to FIGS. 5 and 6, filtering modules 255 and 270 are configured as simple and robust filter, respectively, in "base" mode, while they are configured as robust and simple filter, respectively, in "line" mode. Configuration of the filtering modules is accomplished, for example, by activation of filtering software modules and/or by modification of the parameters of the filtering modules.

According to a second embodiment, switches are used to modify the architecture of the information system of the aircraft according to the connection mode of the PMAT.

Figure 7A:
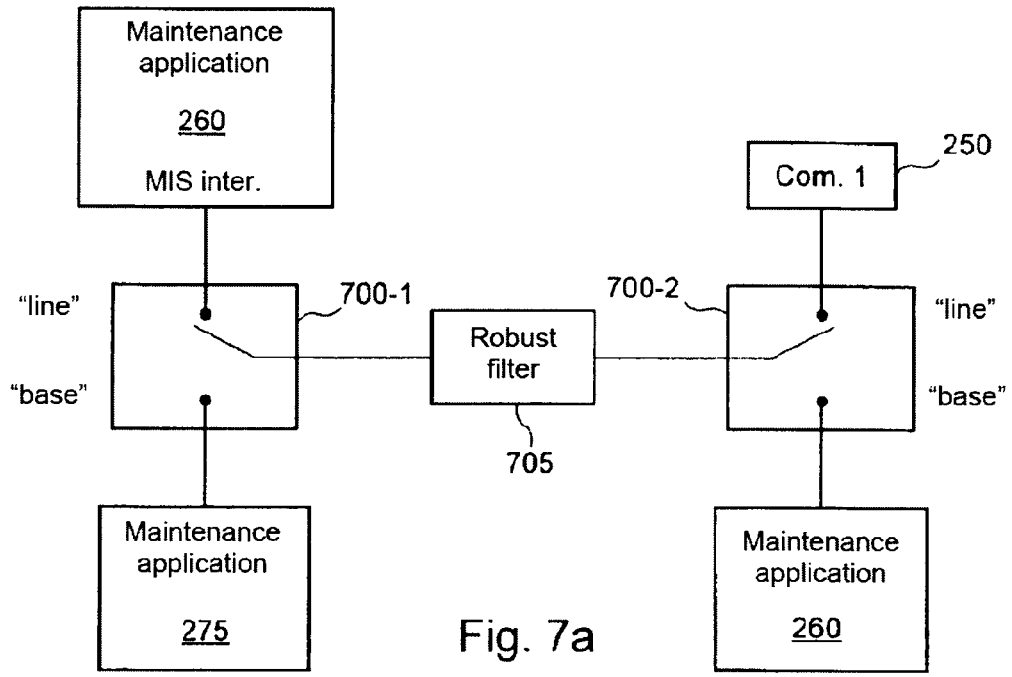

Thus, as illustrated on FIG. 7a, two switches 700-1 and 700-2 controlled by the same command (not shown) may be used in order to modify the position of robust filtering module 705.

When the connection mode is "line," robust filtering module 705 is connected to the MIS interface of maintenance applications 260 belonging to open domain 245 as well as to communication module 250. In other words, robust filtering module 705 is used instead of filtering module 255 (FIG. 6).

Likewise, when the connection mode is "base," robust filtering module 705 is connected to maintenance applications 275 belonging to protected domain 240 as well as to maintenance applications 260 belonging to open domain 245. In other words, robust filtering module 705 is used instead of filtering module 270 (FIG. 5).

In order to ensure the adequacy of the security rules for the robust filter according to its position in the architecture of the information system of the aircraft, the storage means used for storing in memory the configuration of the robust filtering rules advantageously are composed of two segregated elements (each element corresponding to a connection mode). Also, in order to ensure that the random access memory used by the filter is correctly initialized, the robust filtering module preferably is started up again at the time of each change of operating mode.

Figure 7B:
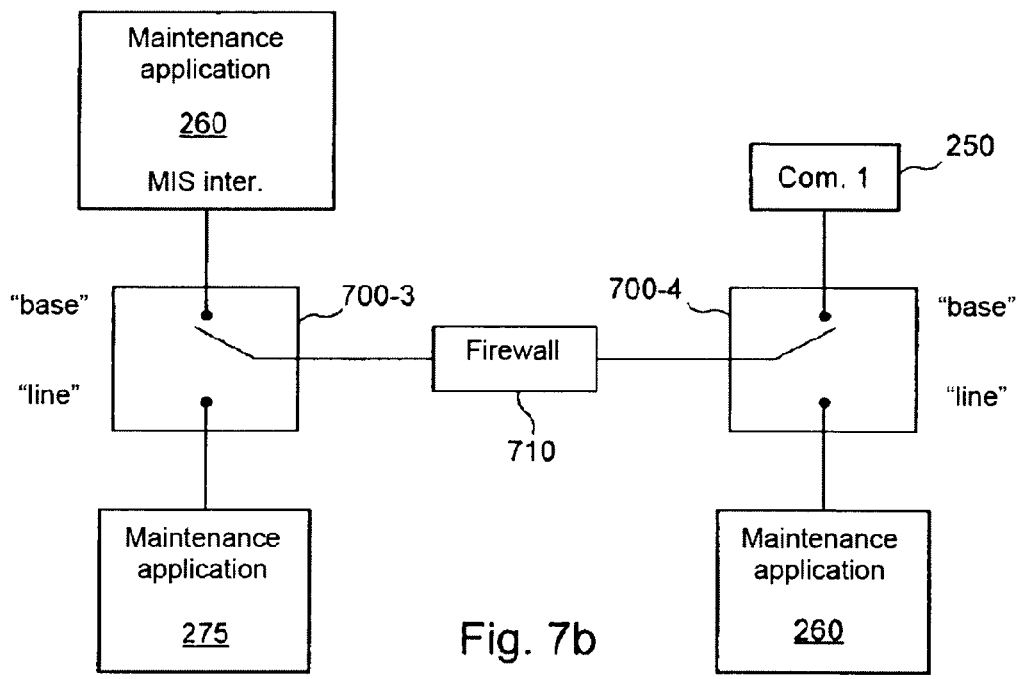

It is possible to control a firewall-type filter in similar manner. Thus, as illustrated on FIG. 7b, two switches 700-3 and 700-4, controlled by the same command (not shown) as that used to control switches 700-1 and 700-2, may be used to modify the position of the firewall-type filtering module.

When the connection mode is "line," the firewall-type filtering module is connected to maintenance applications 275 belonging to protected domain 240 as well as to maintenance applications 260 belonging to open domain 245. In other words, the firewall-type filtering module is used instead of filtering module 270 (FIG. 5).

When the connection mode is "base," the firewall-type filtering module is connected to the MIS interface of maintenance applications 260 belonging to open domain 245 as well as to communication module 250. In other words, the firewall-type filtering module is used instead of filtering module 255 (FIG. 6).

Switches 700-1 to 700-4 are, for example, Ethernet switches making it possible to move the connections of the filtering modules around so as to position them on the infrastructure of the information system of the aircraft according to the connection mode of a PMAT.

Naturally, in order to meet specific needs, an individual competent in the field of the invention will be able to apply modifications in the foregoing description.

The invention claimed is:

1. A method for configuring an on-board maintenance information system in an aircraft, the on-board maintenance information system comprising a first communication interface module, a second communication interface module different from the first communication interface module, a protected domain, an open domain, a first maintenance application module of the protected domain, a second maintenance application module of the open domain, a first data filtering module, and a second data filtering module different from the first data filtering module, the method comprising:
   determining a mode of connection for a mobile maintenance terminal to the on-board maintenance information system;
   when the mobile maintenance terminal is directly connected to the on-board maintenance information system via the second communication interface module, configuring the second data filtering module to filter data exchanged between the first communication interface module and the second maintenance application module of the open domain, and configuring the first data filtering module to filter data exchanged between the first maintenance application module of the protected domain and the second maintenance application module of the open domain; and when the mobile maintenance terminal is connected to the on-board maintenance information system via a maintenance information system on the ground and via the first communication interface module, configuring the second data filtering module to filter data exchanged between the first maintenance application module of the protected domain and the second maintenance application module of the open domain, and configuring the first data filtering module to filter data exchanged between the first communication interface module and the second maintenance application module of the open domain.

2. The method according to claim 1, wherein the second data filtering module includes a robust filter configured to transmit only data satisfying predetermined rules.

3. The method according to claim 1 or claim 2, further comprising configuring the connection mode, said configuring the connection mode being carried out in a protected zone of the aircraft.

4. A non-transitory computer-readable storage medium storing computer-readable instructions that, when executed by a computer causes the computer to perform a method for configuring an on-board maintenance information system in an aircraft, the on-board maintenance information system comprising a first communication interface module, a second communication interface module different from the first communication interface module, a protected domain, an open domain, a first maintenance application module of the protected domain, a second maintenance application module of the open domain, a first data filtering module, and a second data filtering module different from the first data filtering module, the method comprising:

determining a mode of connection for a mobile maintenance terminal to the on-board maintenance information system;

when the mobile maintenance terminal is directly connected to the on-board maintenance information system via the second communication interface module, configuring the second data filtering module to filter data exchanged between the first communication interface module and the second maintenance application module of the open domain, and configuring the first data filtering module to filter data exchanged between the first maintenance application module of the protected domain and the second maintenance application module of the open domain; and when the mobile maintenance terminal is connected to the on-board maintenance information system via a maintenance information system on the ground and via the first communication interface module, configuring the second data filtering module to filter data exchanged between the first maintenance application module of the protected domain and the second maintenance application module of the open domain, and configuring the first data filtering module to filter data exchanged between the first communication interface module and the second maintenance application module of the open domain.

5. A device for configuring an on-board maintenance information system in an aircraft, the on-board maintenance information system comprising:

a first communication interface module and a second communication interface module different from the first communication interface module;

a protected domain and an open domain;

a first maintenance application module of the protected domain;

a second maintenance application module of the open domain;

a first data filtering module; and a second data filtering module different from the first data filtering module, wherein a mode of connection for the mobile maintenance terminal to the on-board maintenance information system is determined by a processor, wherein, when the mobile maintenance terminal is directly connected to the on-board information system via the second communication interface module, the second data filtering module is connected to the first communication interface module and to the second maintenance application module of the open domain to filter data exchanged between the first communication interface module and the second maintenance application module of the open domain, and the first data filtering module is connected to the first maintenance application module of the protected domain and to the second maintenance application module of the open domain to filter data exchanged between the first maintenance application module of the protected domain and the second maintenance application module of the open domain, and wherein, when the mobile maintenance terminal is connected to the on-board information system via a maintenance information system on the ground and via the first communication interface module, the second data filtering module is connected to the first maintenance application module of the protected domain and to the second maintenance application module of the open domain to filter data exchanged between the first maintenance application module of the protected domain and the second maintenance application module of the open domain, and the first data filtering module is connected to the first communication interface module and to the second maintenance application module of the open domain to filter data exchanged between the first communication interface module and the second maintenance application module of the open domain.

6. The device according claim 5, wherein the determined connection mode is configured in a protected zone of the aircraft.

7. The device according to claim 5, further comprising at least two switches controlled by a command signal representing the determined connection mode, wherein a first of the at least two switches is configured to be connected to the first data filtering module or the second data filtering module and to the first maintenance application module of the protected domain or the second maintenance application module of the open domain, and a second switch of the at least two switches is configured to be connected to the first data filtering module or the second data filtering module and to the second maintenance application module of the open domain or the first communication interface module.

8. The device according to claim 5 implemented in the aircraft.

9. The method according to claim 1, wherein the first data filtering module includes a firewall filter.

10. The method according to claim 1, wherein the determined mode is a line mode when the mobile maintenance terminal is directly connected to the on-board maintenance information system via the second communication interface module and is a base mode when the mobile maintenance terminal is connected to the on-board maintenance information system via the maintenance information system on the ground and via the first communication interface module.

11. The method according to claim 10, wherein the protected domain comprises:
   the first maintenance application module and the second data filtering module when the determined mode is the base mode, and
   the first maintenance application module and the first data filtering module when the determined mode is the line mode.

12. The method according to claim 10, wherein the open domain comprises:
   the second maintenance application module and the first data filtering module when the determined mode is the base mode, and
   the second maintenance application module and the second data filtering module when the determined mode is the line mode.

13. The method according to claim 12, wherein the open domain further comprises the first communication interface module and the second communication interface module.

14. The device according to claim 5, wherein the second data filtering module comprises a robust filter.

15. The device according to claim 5, wherein the determined mode is a line mode when the mobile maintenance terminal is directly connected to the on-board maintenance information system via the second communication interface module and is a base mode when the mobile maintenance terminal is connected to the on-board maintenance information system via the maintenance information system on the ground and via the first communication interface module.

16. The device according to claim 15, wherein the protected domain comprises:
   the first maintenance application module and the first data filtering module when the determined mode is the base mode, and
   the first maintenance application module and the second data filtering module when the determined mode is the line mode.

17. The device according to claim 15, wherein the open domain comprises:
   the second maintenance application module and the second data filtering module when the determined mode is the base mode, and
   the second maintenance application module and the first data filtering module when the determined mode is the line mode.

18. The device according to claim 5, wherein the open domain comprises the first communication interface module and the second communication interface module.

19. The method according to claim 1, wherein the second data filtering module includes a higher number of levels of filtering than does the first data filtering module.

* * * * *